Aug. 3, 1965  E. H. KRAMER  3,197,912
BAIT HOLDING FISH HOOK
Filed Jan. 18, 1963  2 Sheets-Sheet 1

INVENTOR.
Ernest H. Kramer
BY
William S. Dorman
ATTORNEY

Aug. 3, 1965 E. H. KRAMER 3,197,912
BAIT HOLDING FISH HOOK

Filed Jan. 18, 1963 2 Sheets-Sheet 2

INVENTOR.
Ernest H. Kramer
BY
William S. Dorman
ATTORNEY

3,197,912
BAIT HOLDING FISH HOOK
Ernest H. Kramer, 5708 E. Haskell Place, Tulsa, Okla.
Filed Jan. 18, 1963, Ser. No. 252,448
1 Claim. (Cl. 43—44.4)

This invention relates to improvements in fishing devices, and more particularly, but not by way of limitation, to a live bait holding or securing means for a fish hook.

It is often considered desirable to utilize live bait when fishing, but it is difficult to combine a fish catching hook with live bait since most means for securing the bait to the hook results in serious injury to the bait, thus rendering it lifeless substantially immediately. Various devices have been developed for securing live bait to a fish hook, but most of these devices limit the freedom of movement of the bait, thus resulting in an unnatural action and reducing the attraction thereof to the fish being sought for catching. Some of these devices, such as that disclosed in the P. S. Yost Patent No. 2,982,049, issued May 2, 1961, and entitled "Fish Hook Bait Securing Means," provide a lasso arrangement for retaining live bait, but presently available devices of this type have certain disadvantages, in that during movement of the live bait the noose arrangement may become sufficiently loosened that the bait may escape.

The present invention contemplates a novel noose or lasso type arrangement for a fish hook particularly designed and constructed for retaining a live minnow or other bait in a manner permitting substantially natural freedom of movement and simultaneously substantially precluding accidental escape or loss of the live bait. A slip knot or sliding type of noose is arranged in connection with the fish hook for readily receiving the live bait, such as a minnow, perch, or the like, therethrough. The weight of the bait maintains the noose tightly engaged around its body without interfering with natural swimming or movement of the bait. Thus, as the minnow or bait swims around in the water in his natural manner, he carries the fish hook with him and any fish attracted by the bait may become entangled or caught on the hook. As a practical matter, it has been found that live bait can be used with the noose type arrangement of the present invention for extended periods of time with substantially no harm thereto, and then released to continue his natural life.

It is an important object of this invention to provide a novel fish hook device for carrying a live bait in combination with the hook.

It is another object of this invention to provide a novel live bait carrying hook device having a noose arrangement particularly designed and constructed for facilitating the disposition thereof around the body of a live bait.

Still another object of this invention is to provide a novel live bait holding fish device wherein the natural movement of the bait is substantially unimpeded for increasing the attraction for fish being sought to be caught.

It is a further object of this invention to provide a live bait holding fish hook device wherein the movement or action and weight of the live bait secured therein functions to securely retain the bait in the device in a manner substantially precluding accidental loss of the bait.

A still further object of this invention is to provide a live bait holding fish hook device of the lasso type wherein the possibility of injury to the live bait is greatly reduced.

Other objects and advantages of the invention will be evident from the following detailed description, read in conjunction with the accompanying drawings, which illustrate my invention.

Figure 1:
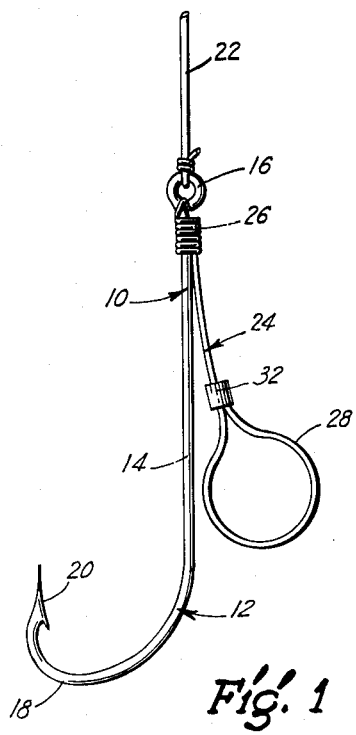
FIGURE 1 is a side elevational view of a fish hook and bait securing means embodying the invention.
Figure 2:
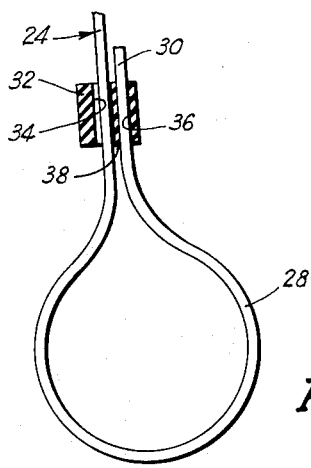
FIGURE 2 is an enlarged view partly in section of a slip knot or noose arrangement, such as may be used with the invention.
Figure 4:
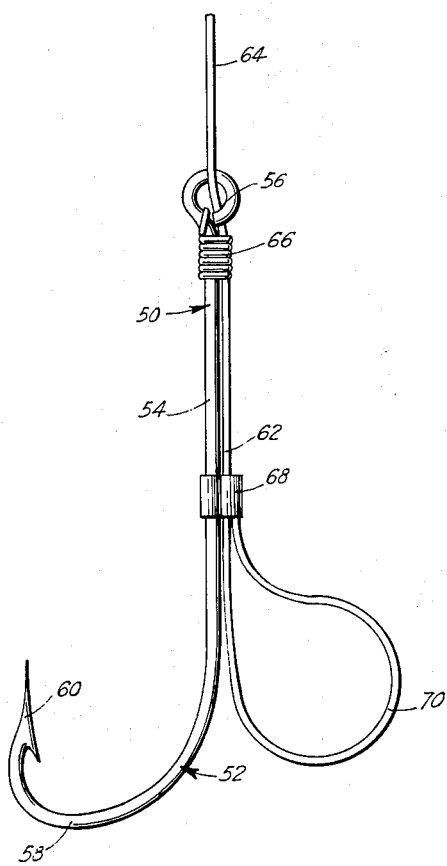
Figure 5:
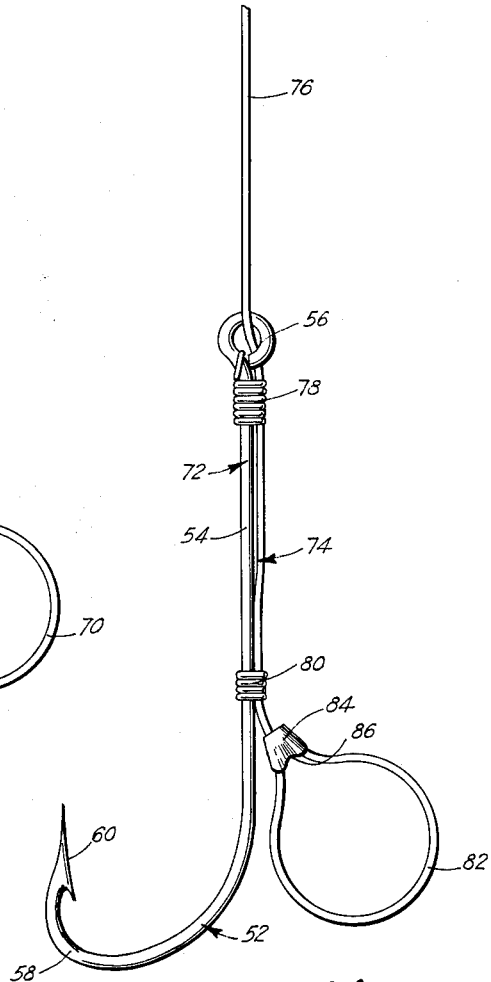

Referring to the drawings in detail and particularly FIGURES 1 and 2, reference character 10 generally indicates a live bait securing fish hook device comprising the usual hook 12 having a shank 14 provided with an eye portion 16 at one end thereof and a curved portion 18 terminating in the usual barb 20 at the opposite end thereof. A leader or line 22 may be attracted to the eye portion 16 in any suitable or well known manner for securing the device 10 to a fishing rod (not shown), or the like.

A bait holding portion 24 is in association with the hook 12 and preferably comprises a length of suitable leader material secured to the eye member 16 in any suitable manner and preferably tightly secured around the shank portion 14 immediately adjacent the eye member 16 by a plurality of convolutions or wraps 26 of the said length of leader material. A noose or lasso portion 28 is provided for the bait holding portion 24 and comprises a loop of the leader material having the free end 30 (FIGURE 2) thereof extending in a reverse direction through a tubelike member 32 which is slidably arranged on the said leader material in order to provide substantially any desired size for the noose 28.

Referring now to FIGURE 2, the leader material of the bait holding portion 24 preferably extends through a bore 34 provided in the tube 32 in such a manner that the tube 32 is slidable therealong. The end 30 preferably extends through a second bore 36 provided in the tube 32 adjacent and parallel to the bore 34 and may be fastened therein in any suitable manner (not shown) as to preclude accidental removal of the end 30 from the tube 32. The tube 32 is so arranged with respect to the said leader material that a substantially V-shaped configuration is provided for the noose 28 immediately adjacent the tube 32, as shown at 38. This maintains the noose 28 substantially centered with respect to the sleeve or tube 32 which facilitates insertion of the bait (not shown) within the noose 28 during use of the device 10, as will be hereinafter set forth. It will be readily apparent that the tube 32 is free to slide along the length of leader of the device or portion 24 in order that the size of the noose 28 may be varied in accordance with the size of the bait to be retained therein.

In order to secure a minnow, or the like, to the device 10 the bait holding portion 24 may be manually grasped in any suitable manner such as between the fingers and thumb in such a manner that the loop 28 extends from the fingers for receiving the minnow, or the like, therethrough. It is preferable to grasp the tube member 32 and slide it along the leader material to provide the desired size for the loop 28 in order to facilitate insertion of the bait therethrough. It is to be noted that the particular arrangement of the sleeve 32 with the noose 28 forming the V-portion 38 as hereinbefore set forth keeps the noose 28 substantially centered with respect to the tube 32, thus greatly facilitating placing of the noose over or around the bait. When the bait has been inserted within the loop or noose 28, a pull on the leader material of the holding portion 24 and above the tube 32 will tightly secure the noose around the bait. The weight of the bait in the noose or loop 28 will keep the loop tightly in place around the bait for substantially precluding accidental loss thereof. In addition, the bait has great freedom of movement through the water for attracting larger fish. When it is desired to remove the live bait, the tube 32 may be manually moved along the leader material of the bait holding device 24 for loosening the engagement of the noose 28 with the bait to permit easy removal thereof.

Figure 3:
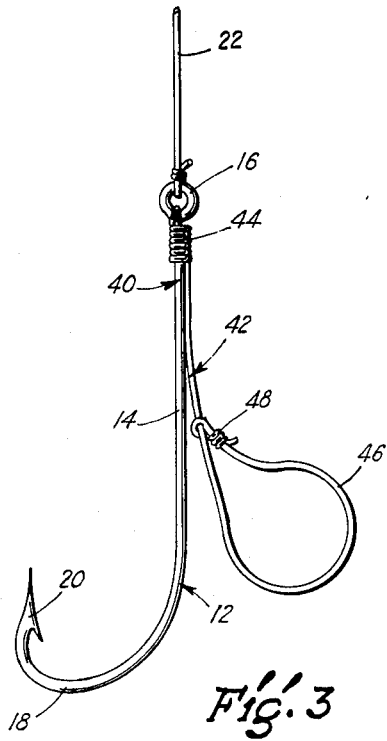
FIGURE 3 is a side elevational view of a fish hook having a modified form of bait holding means secured thereto.

Referring now to FIGURE 3, a bait holding fish hook device 40 is shown, which is generally similar to the device 10. In this embodiment, the hook 12 having the eye portion 16 at one end of the shank 14 and the curved portion 18 and barb hook 20 at the other end thereof is secured to the leader 22 in the same manner as hereinbefore set forth, and a bait holding portion 42 is provided in lieu of the portion 24 depicted in FIGURES 1 and 2. The bait holding portion 42 is constructed from suitable leader material, or the like, and may be secured to the eye portion 16 and around the shank 14 adjacent thereto in any suitable manner, such as the plurality of convolutions 44 of the leader material. The opposite end of the leader material is formed into a noose or loop 46 by utilizing a suitable slip knot 48 engaged around the leader material. In this manner, the size of the noose or loop 46 may be adjusted in accordance with the size of the bait and the weight of the bait therein maintains the slip knot 48 in such position on the leader material as to tightly secure the bait within the loop 46.

From the foregoing, it will be apparent that the present invention provides a novel live bait holding fish hook, particularly designed and constructed for securely retaining the live bait in a manner substantially precluding accidental loss thereof. The live bait is retained in relationship with the hook member in such a manner as to permit natural and free movement of the bait while simultaneously maintaining the hook in a close proximity thereto. The novel live bait holding fish hook device is simple and efficient in operation and economical and durable in construction.

Changes may be made in the combination and arrangement of parts as heretofore set forth in the specification and shown in the drawings, it being understood that any modification in the precise embodiment of the invention may be made within the scope of the following claim without departing from the spirit of the invention.

What is claimed is:

A fish hook device comprising a fish hook means including an elongated substantially straight portion having an eye member at one end thereof and a curved portion at the opposite end thereof, a barb member provided on the outer extremity of the curved portion, a single leader member having one end only thereof securely fastened to the straight portion in the proximity of the eye member, the opposite end of said leader member being completely independent of any connection with the fish hook means and being slidably secured to the leader member itself to form an adjustable loop which is completely independent of any connection with the fish hook means, said loop being provided for receiving a live bait therein, said loop being oppositely disposed from said curved portion and adjacent thereto, and said adjustable loop being responsive to the weight of the bait secured therein for tightening around the bait during movement of the bait to substantially preclude accidental loss of the bait from the fish hook device.

References Cited by the Examiner

UNITED STATES PATENTS

| | | | |
|---|---|---|---|
| 1,613,113 | 1/27 | Leu | 43—44.4 |
| 2,333,503 | 11/43 | Worden | 43—44.4 |
| 2,982,049 | 5/61 | Yost | 43—44.4 |
| 3,096,010 | 7/63 | Rasmussen | 224—7 |

ABRAHAM G. STONE, *Primary Examiner.*

S. KOREN, *Examiner.*